(12) United States Patent
Studerus et al.

(10) Patent No.: US 11,746,034 B2
(45) Date of Patent: Sep. 5, 2023

(54) HOT FORMING DEVICE FOR PRODUCING GLASS CONTAINERS FROM A GLASS TUBE

(71) Applicant: SCHOTT PHARMA AG & CO. KGAA, Mainz (DE)

(72) Inventors: Diego Studerus, Steinach (CH); Oliver Fruhner, Mainz (DE); Andreas Groh, Dienheim (DE)

(73) Assignees: SCHOTT Pharma AG & Co. KGaA, Mainz (DE); SCHOTT Pharma Schweiz AG, St. Gallen (CH)

( * ) Notice: Subject to any disclaimer, the term of this patent is extended or adjusted under 35 U.S.C. 154(b) by 0 days.

(21) Appl. No.: 16/938,271

(22) Filed: Jul. 24, 2020

(65) Prior Publication Data

US 2020/0354256 A1 Nov. 12, 2020

Related U.S. Application Data

(63) Continuation of application No. PCT/EP2019/051699, filed on Jan. 24, 2019.

(30) Foreign Application Priority Data

Jan. 26, 2018 (DE) .................... 10 2018 101 840.1

(51) Int. Cl.
  *C03B 23/11* (2006.01)
  *C03B 23/045* (2006.01)
  *C03B 23/09* (2006.01)

(52) U.S. Cl.
  CPC .......... *C03B 23/112* (2013.01); *C03B 23/045* (2013.01); *C03B 23/09* (2013.01)

(58) Field of Classification Search
  None
  See application file for complete search history.

(56) References Cited

U.S. PATENT DOCUMENTS

| 3,424,570 A | 1/1969 | Couquelet |
| 5,300,134 A * | 4/1994 | Mannl ................... C03B 23/112 |
| | | 65/109 |

(Continued)

FOREIGN PATENT DOCUMENTS

| CN | 101011793 | 8/2007 |
| CN | 101034863 | 9/2007 |

(Continued)

OTHER PUBLICATIONS

Motor Control Tips, FAQ: What is pole count and why does it matter?, https://www.motioncontroltips.com/faq-what-is-pole-count-and-why-does-it-matter/,Jun. 8, 2015 (Year: 2015).*

(Continued)

*Primary Examiner* — Queenie S Dehghan
(74) *Attorney, Agent, or Firm* — Ruggiero McAllister & McMahon LLC

(57) ABSTRACT

A hot forming device for producing glass containers from a glass tube is provided. The device includes a machine frame, a turntable, a plurality of holding chucks, and a direct drive motor. The turntable is mounted on the machine frame. The holding chucks are arranged on the turntable. The turntable is connected to the machine frame directly by the direct drive without a transmission. The direct drive has a stator arranged in an upper region of the machine frame and a rotor on the turntable.

20 Claims, 7 Drawing Sheets

(56) References Cited

U.S. PATENT DOCUMENTS

2014/0373574 A1 12/2014 Moseler
2019/0263707 A1 8/2019 Frost

FOREIGN PATENT DOCUMENTS

| CN | 106517754 | 3/2017 |
|---|---|---|
| DE | 202004004560 | 7/2004 |
| DE | 10341300 | 1/2005 |
| DE | 202008017806 | 7/2010 |
| EP | 2165983 | 3/2010 |
| EP | 2818454 | 12/2014 |
| KR | 101704463 | 2/2017 |
| WO | 00/39037 | 7/2000 |
| WO | 2005092805 | 10/2005 |
| WO | 2018091234 | 5/2018 |

OTHER PUBLICATIONS

International Search Report dated Apr. 16, 2019 for International Application No. PCT/EP2019/051699.
English translation of Written Opinion dated Apr. 16, 2019 for International Application No. PCT/EP2019/051699, 6 pages.
English translation of International Preliminary Report on Patentability dated Jul. 28, 2020 for International Application Mo. PCT/EP2019/051699, 7 pages.

* cited by examiner

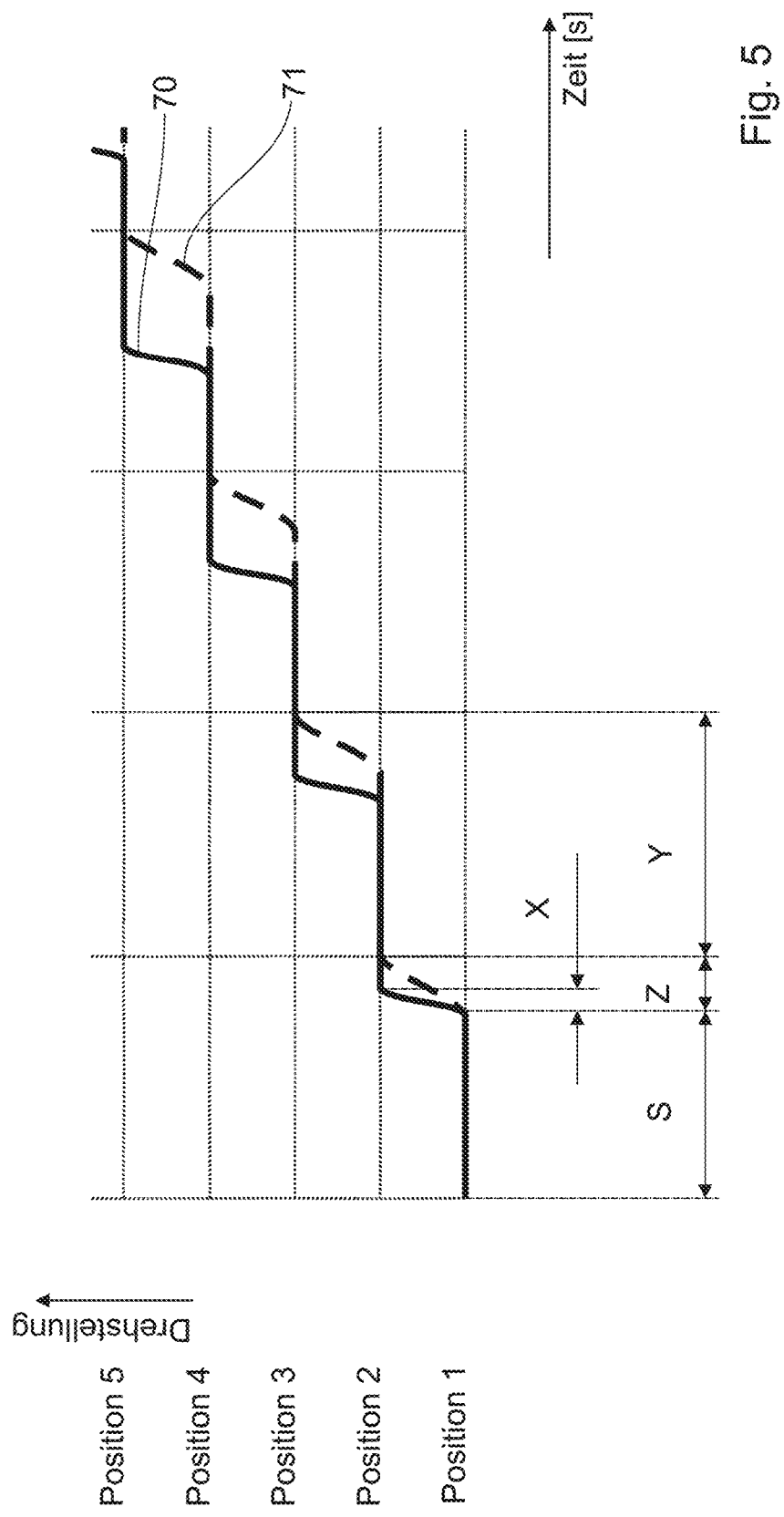

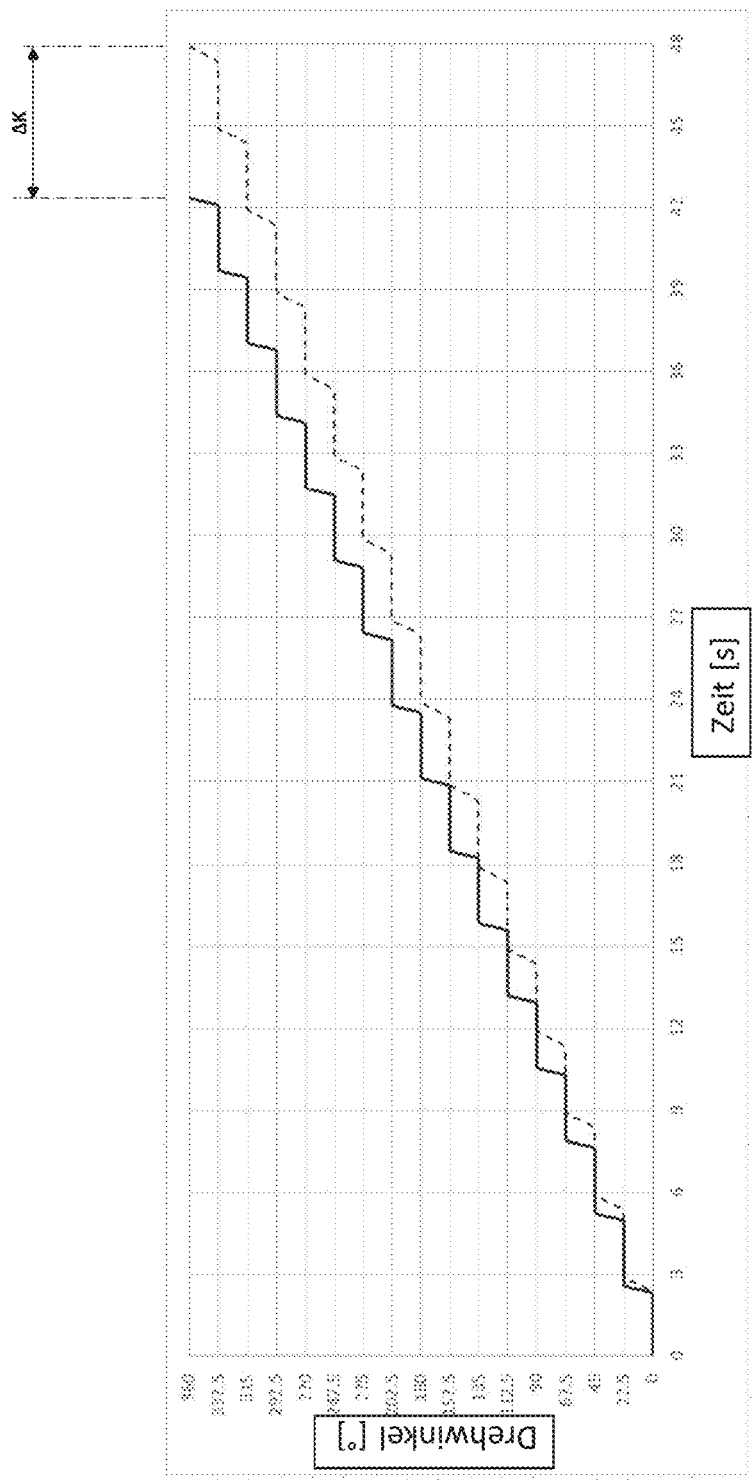

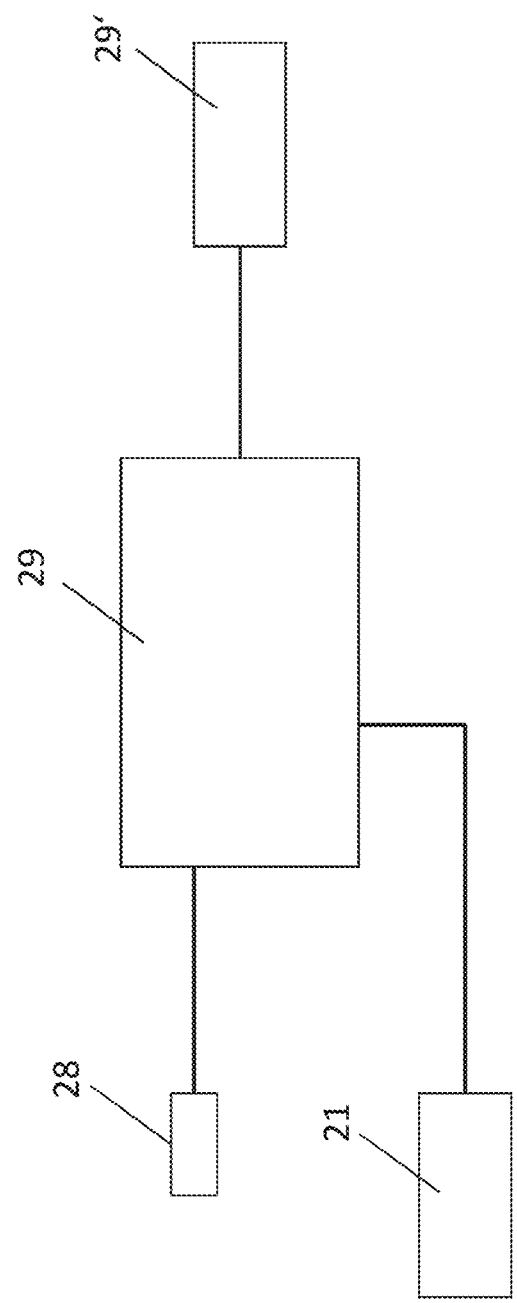

HOT FORMING DEVICE FOR PRODUCING GLASS CONTAINERS FROM A GLASS TUBE

CROSS REFERENCE TO RELATED APPLICATIONS

This application is a continuation of International Application PCT/EP2019/051699 filed Jan. 24, 2019, which claims the benefit of German application 10 2018 101 840.1 filed on 26 Jan. 2018, the entire content of both of which are expressly included herein by way of reference.

BACKGROUND

1. Field of the Invention

In general terms, the present invention relates to a device for producing glass containers and, in particular, relates to a hot forming device for producing glass containers from a glass tube, in particular for use as a primary packaging means for pharmaceutical active substances, e.g. as glass vials, cartridges or syringe barrels.

2. Description of Related Art

A hot forming device of this kind is known from DE 103 41 300 B3 and, like the hot forming device according to the present invention, is used to produce glass containers from a glass tube, in particular for use as a primary packaging means for pharmaceutical active substances, e.g. as glass vials, cartridges or syringe barrels.

Such a vertically aligned hot forming device is shown in a schematic plan view and in a sectioned side view in FIGS. 1 and 2 and has two turntables 102, 132, which are each turned in steps around an associated turret 101, 131 in order to pass through a series of machining stations B1 to B15 for machining and hot forming. The number and arrangement of the machining stations can vary depending on the product to be manufactured. A plurality of holding chucks 106, 136 for holding workpieces, that is to say glass tube sections 160, 161, is in each case arranged in a manner distributed over the circumference of the turntables 102, 132. The turrets 101, 131 are each driven by a combination of an electric motor 110, 140 and a transmission 111, 141. The respective transmission 111, 141 and the associated motor 110, 140 are mounted below the working plane (work plate) 150. The tools 116 and heat sources, e.g. gas burners 104, 134, for forming are mounted on the work plate 150. A turret comprising a co-rotating rotary column and a rotary ring 102, 132 mounted thereon, which ring accommodates the holding chucks 116, 136 for the glass tube 160 or for the semifinished glass products 161, is mounted on the output side of the transmission 111, 141. In the working mode, the turrets pivot from working position to working position (B1, . . . B15) and are synchronized for product transfer during the transfer from the main turret to the secondary turret.

During the clocked rotary motion, relatively large masses must be accelerated and braked again in each case. Owing to the very high forces which occur, especially at high clock rates, this can lead to impairment of the product quality. Thus, vibration between the machining tools and the workpieces to be machined (glass tube section) can occur, especially at high clock rates, and this impairs the product quality.

Because the rotary ring holding the workpieces and the drive motor are coupled to one another indirectly via a transmission, a certain backlash in the drive train of the hot forming device is inevitable, and this is evident particularly in an angular backlash W2 between the axis of the glass tube 160 and the tool 115, and leads to an angular backlash and axial offset between the holding chucks 106 and 136. This backlash not only reduces the achievable product quality but also increases wear, especially at relatively high clock rates.

Comparable hot forming devices of the abovementioned type are disclosed in DE 20 2004 004 560 U1, WO 2005/092805 A1 and EP 2 818 454 A1. In WO 2005/092805 A1, there is a proposal, for example, to compensate the deviation in the position of the glass tube or container pre-product from the setpoint position at which the machining tool is positioned by arranging the machining tools in such a way that they can be traversed in the table plane on a cross table.

In view of the increasing requirements on the product quality of glass containers for use as primary packaging means for pharmaceutical active substances, there is therefore a need for further improvement.

WO 0039037 A1 discloses a hot forming device for producing glass containers from a glass tube having a turntable, on the lower end of which the rotor is directly provided, wherein the rotor lies directly opposite the stator and wherein the stator is secured on the base. However, a relatively large distance must be maintained between the turntable and the base and thus also with respect to the associated bearing regions, in particular in order to avoid problems with the relatively high temperatures in the actual machining zone.

EP 2165983 A1 discloses a glass machine for producing glass products, e.g. bottles or drinking glasses, from a glass melt. The use of an electric motor with a high number of pole pairs is disclosed. However, the electric motor is coupled to the turntable via a transmission and is thus at a long distance from the region of the machining process.

DE 202008017806 U1 discloses a glass machine comparable to the glass machine disclosed in EP 2165983 A1.

SUMMARY

It is an object of the present invention to provide an improved hot forming device for producing glass containers from glass tubes, whereby glass containers of uniformly high quality can be produced reliably and efficiently, even at very high clock rates.

According to the present invention, a hot forming device for producing glass containers from a glass tube is provided, having a turntable, which is rotatably mounted on an associated machine frame section, wherein a plurality of holding chucks for holding workpieces is arranged in a manner distributed over the circumference of the turntable, and wherein the turntable is coupled to a drive motor in order to drive a rotary motion of the turntable. In this arrangement, the drive motor is designed as a direct drive, with the result that the turntable is connected to the associated machine frame section directly and without the interposition of a transmission.

According to the invention, the associated machine frame section is designed as a support, which is arranged in a fixed manner on a worktable, wherein the stator of the direct drive is arranged in the upper region of the associated support, and wherein the rotor of the direct drive is provided on the turntable.

To minimize backlash, the direct drive is in this case arranged as close as possible to the actual machining plane in which the glass tube or semifinished product is positioned while it is being machined and hot-formed. Here, the direct drive is arranged above a work plate, wherein the machine frame section is designed as a support which extends perpendicularly to the work plate or a worktable and serves to support the stator and the turntable because, in this way, the distance between the direct drive or the rotary mounting associated with the direct drive, which serves to provide rotatable mounting for the turntable, and the actual machining plane can be minimized, resulting in reduced backlash, lower wear and thus higher machining accuracy.

According to the invention, the direct drive overall is in this case arranged between the machine frame section and the turntable, considerably reducing the rotating mass, reducing, by virtue of the geometry, the angular misalignment between the tool and the workpiece or glass tube or semifinished product as well as the tendency for backlash to increase due to wear of a bearing and, ultimately, increasing positioning accuracy through a larger effective diameter at the motor and the elimination of the transmission. Thus, according to the invention, glass containers with a uniformly high quality can be produced reliably and efficiently, even at very high clock rates. In particular, the reduced moving mass leads to higher accuracy in the machining and hot forming of the glass containers and thus to a higher production yield.

As is known, direct drives are drives in which the electric machine and the work machine are connected directly to one another. In this case, the electric motor is configured in such a way that it has the same speed as the work machine, thus making it possible to dispense with an interposed transmission. The machine frame section, designed as a fixed column for example, in this case forms the stator, while the movable turntable is mounted axially and forms the rotor. By means of a high number of pole pairs in the electric motor, the speed can be significantly lowered with the existing power supply frequency, and this results, in particular, in a high torque, especially at the beginning of the pivoting of the turntable.

Here, the abovementioned support serves essentially to provide suitable support and mounting for the stator of the direct drive and, for this purpose, can in principle have any desired profile, being designed, for example, as a support with a rectangular or square cross section and extending perpendicularly to the worktable or work plate. According to a preferred further embodiment, it is possible, in particular, for the support to be designed as a column with a circular cross section because, in this way, the distances between the support or rotary bearing and the turntable mounted thereon can be minimized even further.

According to another embodiment, the direct drive comprises a torque motor with a high number of pole pairs, which is expediently greater than twenty and, for the turntable of a parent machine for example, is thirty-three or forty-four and, for the turntable of a base machine, can be thirty-three or twenty-two. In simple terms, a torque motor can be regarded as a large servomotor with a hollow shaft optimized for high torques. Torque motors are usually brushless DC motors but in some cases switched reluctance motors are also referred to as torque motors. In other words, a torque motor in the sense according to the present invention is often also a drive referred to colloquially as a low-speed or high-torque drive. Torque motors in the sense according to the present invention can be designed as external rotor motors (stator on the inside, rotor on the outside) or as conventional internal rotor motors (rotor on the inside, stator on the outside). Here, external rotor motors can make available a higher torque for the same overall size.

A torque motor is distinguished especially by an enhanced torque resulting primarily from the relatively high number of pole pairs and the resulting short paths for the magnetic return, leading to low conductor losses and a low ratio of mass to torque. Moreover, torque motors can be produced easily with a relatively large diameter. Here, the high drive torque of torque motors allows high accelerations and high dynamic response of the system. Torque motors have a higher drive rigidity than motor-transmission units according to the prior art and do not have any rotary backlash. In particular, they also allow better control properties by virtue of reduced disturbances and increased repetition accuracy. Torque motors make little noise and require little maintenance owing to the elimination of mechanical elements. There is virtually no wear in a torque motor.

Because the stator of the direct drive or torque motor is arranged on the associated machine frame section, in particular in the upper region of an associated column, the distance between the torque motor and the actual machining region can advantageously be reduced, allowing higher machining accuracy while reducing the moving mass at the same time.

According to the invention, the associated machine frame section is designed as a support as stated above, in particular as a column, which is arranged in a fixed manner on the worktable, wherein the stator of the direct drive or torque motor is arranged in the upper region of the associated support or associated column. The support or column allows access to the glass tube to be machined at the individual machining stations along the path of motion of the turntable, not only from a position radially outside the turntable but also from regions which overlap the turntable when viewed from above.

Because the associated support or associated column is arranged in a fixed or rotationally rigid manner on a worktable or above said table, the structure can be given sufficient dynamic rigidity to allow the driving forces which prevail during the pivoting of the turntable to be absorbed. For this purpose, it is expedient if the support or column is of relatively short design, thus enabling the distance between the rotary bearing and a working plane between the glass tube or a semifinished product after the separation from the glass tube and a machining tool to be relatively small, and making it possible, in particular, for the rotary bearing to be arranged on a parting plane between the glass tube and the semifinished product separated therefrom.

According to another embodiment, a rotor of the respective torque motor is preferably provided directly on the turntable. Thus, the torque is transferred via only a few components with a low moving mass and a maximum rigidity of the structure, allowing higher frequencies in the clocked pivoting, thus enabling more products to be produced per unit time. Moreover, the tendency for vibration between the rotating turntable and the machine frame declines sharply because the mass ratio of the structure becomes much more favorable.

According to another embodiment, the rotor of the respective torque motor is designed as an extension with a suitable profile corresponding to the profile of the abovementioned support or column, in particular as a cylindrical or polyhedral extension, wherein the extension projects perpendicularly from a lower side of the respective turntable and projects into the upper region of the associated support, in particular of the associated column. This arrangement allows even higher rigidity of the drive assembly and thus a higher product quality, even at relatively high clock rates during hot forming.

According to another embodiment, the stator of the respective torque motor is arranged directly in a circumferential aperture in the upper region of the associated support, in particular of the associated column, or the poles of the stator are arranged in a plurality of apertures in the upper region of the associated support, in particular of the associated column. The stator is thus connected directly in a space-saving manner to the associated support, in particular to the associated column, allowing an even higher rigidity of the drive assembly.

Overall, the mounting for the rotation of the turntable is attached to the turntable directly or via a small number of additional attachment parts, thus enabling the rotor, together with the turntable, to be held reliably in a vertical and axial position and ensuring that rapid pivoting movements are possible. In principle, there is a free choice of bearing diameter, which is limited only by the diameter of the support, in particular the column, and the pitch circle of the holding chucks on the turntable. According to the invention, a large bearing diameter can be chosen in comparison with conventional motor-transmission arrangements, allowing a small distance with respect to the holding chucks of the glass tubes or semifinished products. According to the invention, a large bearing diameter reduces the specific loading on the rotary bearing and thus the tendency for backlash to increase, allowing high accuracy over a very long run time.

According to another embodiment, the rotary bearing is arranged at a short distance from a working plane between the glass tube or a semifinished product after separation from the glass tube and a machining tool, or the rotary bearing is arranged in a parting plane between the glass tube and the semifinished product separated therefrom, wherein the maximum distance can be of the order of an axial length of a glass container to be produced, for example. The vertical distance between the rotary bearing and a working plane of the respective turntable can be at most 40 cm, more preferably at most 20 cm and even more preferably in a range between 3 cm and 15 cm. In this way, tilting moments, which impair precision in machining or hot forming, can be reduced in an effective manner.

According to another embodiment, the respective drive motor is assigned a sensor for detecting a rotational position or position of the associated turntable. This allows precise control of the angular position of the motor shaft and of the rotational speed and acceleration, allowing even higher accuracy in machining and hot forming.

According to another embodiment, the sensor is arranged in the region of the rotary bearing of the associated machine frame section. Owing to the short distance between the sensor and the rotary bearing, an integrated high-resolution measuring system can be achieved, which accurately measures the angular motion in the region of the mounting of the turntable and makes possible a control circuit for optimizing the angular positioning accuracy of the respective turntable even further.

According to another embodiment, the sensor is assigned a control circuit, which processes a rotational position of the associated turntable detected by the sensor and controls a movement of the respective drive motor so as to correspond to at least one adjustable setpoint, wherein the at least one adjustable setpoint is preferably stored in a lookup table, which is connected to the control circuit. The control circuit is preferably operated in a closed configuration and can be torque-, speed- or position-controlled.

According to another embodiment, the turntable performs stepwise rotary movements at a constant clock rate, wherein the ratio of a time for pivoting the turntable to a new working position to a standstill time, during which the turntable remains at the new working position, can preferably be set in a variable manner because the drive motors are designed as direct drives and the respective turntable is connected to the associated support, in particular to the associated column, directly and without the interposition of a transmission. In contrast, conventional drive systems, in particular drive systems with indexing mechanisms, always have a fixed ratio (Z/S=const) built into the transmission. According to the invention, this variability allows a sufficiently long standstill time, even at very high clock rates, this being necessary to machine or form the glass tube or semi-finished product further.

According to another embodiment, the hot forming device has at least one second turntable, which is coupled to a drive motor, which can, in particular, likewise be designed as a direct drive in the manner described above. In this case, the turntables perform stepwise rotary movements at a constant clock rate around the associated axes of rotation, wherein the ratio of a time (Z) for pivoting the turntables to a new working position to a standstill time (S), during which the turntables remain at the new working position during machining/hot forming, is preferably variable.

According to another embodiment, paths of motion of the first turntable and of the second turntable intersect at a point at which the transfer of a workpiece from a holding chuck of the first turntable to a holding chuck of the second turntable takes place, wherein machining tools and gas burners for machining and hot forming the glass containers are arranged at discrete working positions along the paths of motion of the first and the second turntable.

According to another embodiment, the associated machine frame sections are, as explained above, embodied as supports, in particular as columns, which are arranged in a manner laterally offset with respect to one another, e.g. on a machine table, wherein a rotary bearing is provided in a circumferential aperture in the upper region of the associated support, in particular of the associated column. This arrangement makes it possible both to arrange the glass tube to be machined in the "parent machine" and to arrange the semi-finished product in the "base machine" of the hot forming device at a short distance from the bearings and drives of the associated support, in particular of the associated column, during machining and hot forming, which helps to further reduce any backlash and contributes to an advantageously high rigidity of the drive assembly.

According to another embodiment, the drive motors are arranged coaxially with the associated support, in particular the associated column, wherein the supports or columns are arranged at different vertical levels and thus in a partially overlapping manner. In this case, the supports or columns can be arranged on machine tables arranged adjacent to one another but at different vertical levels. An arrangement of the supports or columns at different vertical levels can also be achieved if the upper end of the support associated with the second turntable, in particular of the associated column, extends through an opening in a worktable on which the support, in particular column, associated with the first turntable is arranged in a fixed manner. In this way, the machining plane of the second turntable can be arranged below the machining plane of the first turntable, advantageously contributing to further reducing the distance between the glass tube to be machined or the semifinished product and the bearings and drives of the associated support, in particular of the associated column.

BRIEF DESCRIPTION OF THE DRAWINGS

The invention is described below by way of example and with reference to the attached drawings, from which further features, advantages and problems to be solved will become apparent. In the drawings:

FIG. 5 shows, in a comparative view, an adjustment curve of a hot forming device according to the present invention and an adjustment curve of a hot forming device according to the prior art;

FIG. 6 shows, in a comparative view, an adjustment curve of a hot forming device according to the present invention and an adjustment curve of a hot forming device according to the prior art; and FIG. 7 shows a control circuit for increasing the angular positioning accuracy in a hot forming device according to the present invention in a schematic illustration.

In the figures, identical reference signs denote elements or groups of elements which are identical or have a substantially identical action.

DETAILED DESCRIPTION

Figure 3:
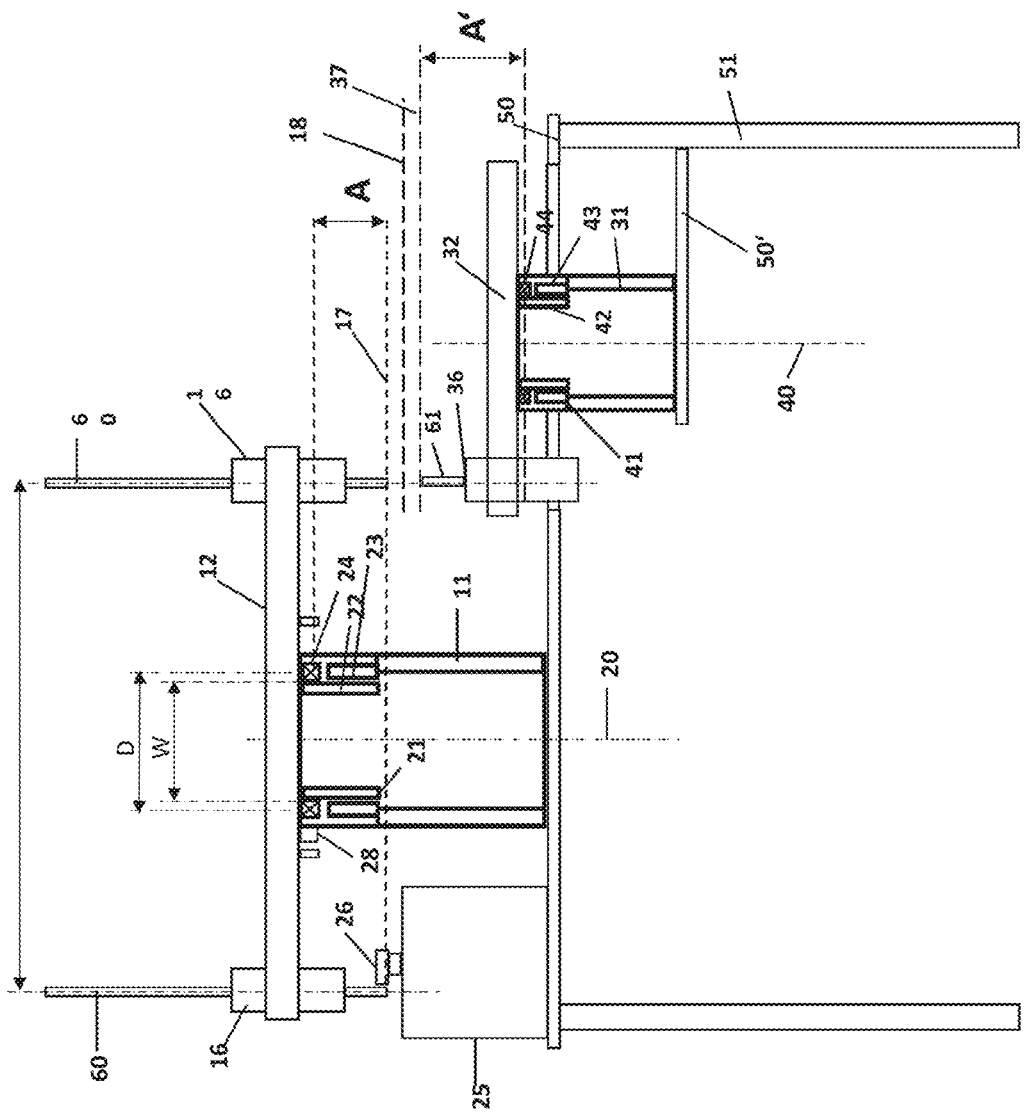
FIG. 3 shows a hot forming device according to the present invention in a schematic sectioned side view.
Figure 4:
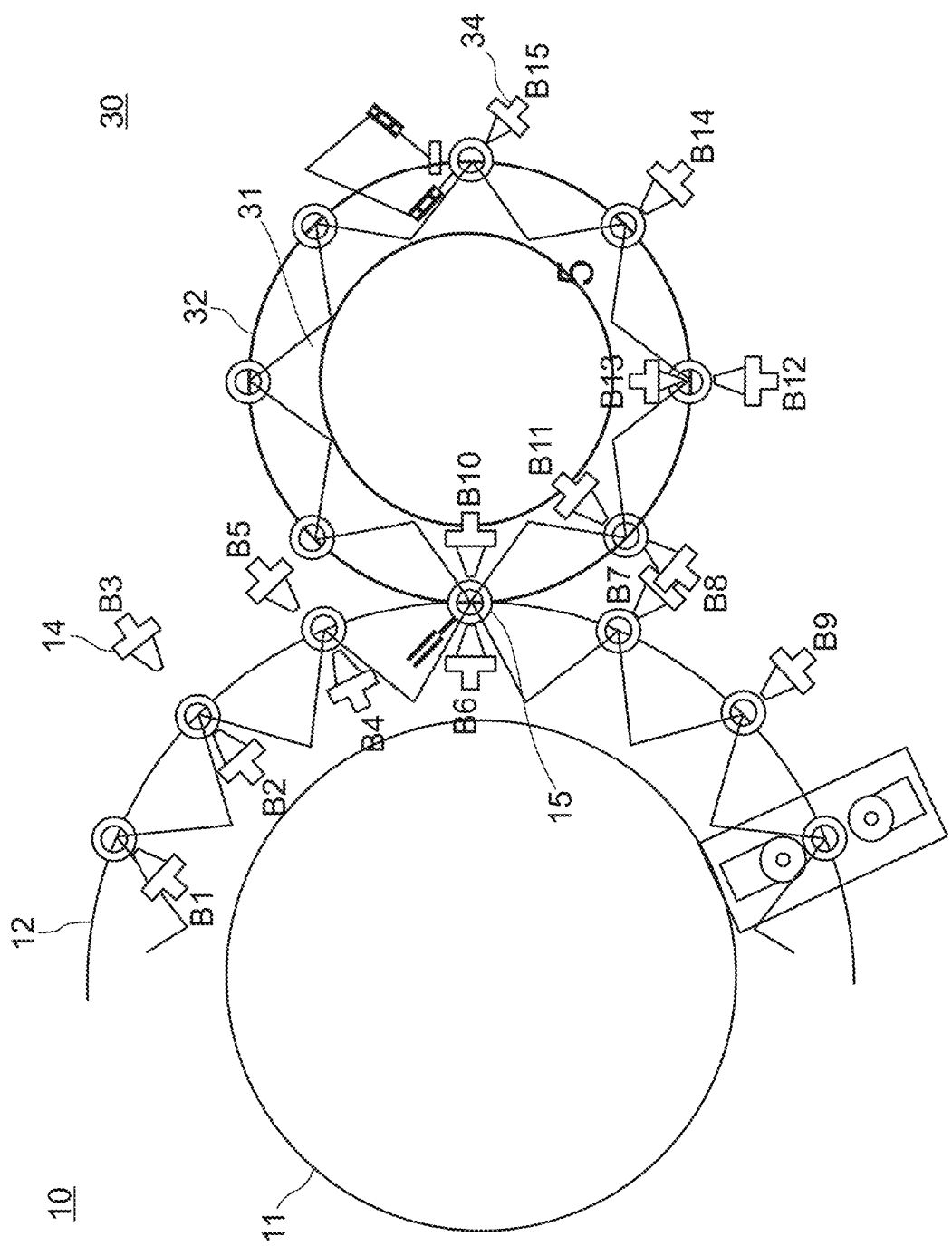
FIG. 4 shows parts of the hot forming device according to FIG. 3 in a schematic plan view.

The hot forming device 1 shown in FIGS. 3 and 4 is used to produce glass containers from a glass tube 60, which is fed in vertical alignment from above. The glass containers, e.g. glass vials, cartridges or syringe barrels, to be produced are used to store pharmaceutical active substances. In this case, the hot forming device 1 comprises a "parent machine" 10, which is used, in particular, for hot forming the supplied glass tube 60 at an end situated opposite the subsequent base or open end of the glass container, and a "base machine" 30, which is arranged downstream of the parent machine 10 and is used, in particular, to form the base or the open end of the glass container. For this purpose, the hot forming device 1 comprises two turntables 12, 32 arranged laterally offset with respect to one another. However, it should expressly be noted that the drive concept according to the present invention can, of course, also be used when only one turntable is provided. The number of turntables and the geometrical arrangement thereof generally depends on the product to be manufactured.

The supplied glass tube 60 or semifinished products are held in holding chucks 16, 36 at a suitable machining height, which are arranged in a manner distributed over the circumference of the turntables 12, 32. The turntables 12, 32 are designed with holding chucks 16, 36 and are rotatably mounted on the associated sections 11, 31 of a mounting frame or worktable 50. In the present case, the associated sections 11, 31 of the mounting frame or worktable 50 are designed as columns 11, 31. In principle, the columns 11, 31 can be designed as supports, as stated above, with a suitable profile, which extend perpendicularly to the associated worktable 50 and serve to provide suitable rotary mounting for the turntables 12, 32 at a suitable distance from the associated worktable 50.

The turntables 12, 32 are rotated or pivoted in steps around the associated supports or columns 11, 31. In this case, the glass tubes 60 or semifinished products 61 held on the holding chucks 16, 36 are moved in steps past various machining stations B1 . . . B15, at which the machining and hot forming to give the glass containers takes place during a respective standstill time. In particular, these machining stations B1 . . . B15 comprise machining tools 26 for machining and heating devices, e.g. gas burners 14, 34, wherein it should expressly be noted that the illustrated number of machining stations B1 . . . B15 is merely illustrative and is not intended to restrict the invention. As shown in FIG. 4, the path of motion of the first turntable 12 and of the second turntable 32 intersect at a transfer position 15, at which the transfer of a workpiece 60 from a holding chuck 16 of the first turntable 12 to a holding chuck 36 of the second turntable 32 takes place. Further details of a structure of this kind can be found, for example, in EP 2 818 454 A1 or PCT/EP2017/077114, filed on Oct. 24, 2017, by the applicant, the contents of which are hereby expressly incorporated by reference.

According to FIG. 3, the two supports or columns 11, 31 are arranged in a fixed manner or in a rotationally rigid manner on the upper side of a work plate 50, 50', which is mounted on a frame 51. It is expedient if the lower ends of the supports or columns 11, 31 do not project beyond the lower side of the respectively associated work plate 50, 50'.

Arranged within the supports or columns 11, 31 are direct drives 21, 41, which drive the rotary motion of the supports or columns 11, 31. To be more precise, the direct drives 21, 41 are each preferably arranged in the region of the upper end of the respective column 11, 31. In the embodiment illustrated, the direct drive is designed as a torque motor 21, 41 with a high number of pole pairs of, for example, at least twenty pole pairs, more preferably of at least thirty pole pairs. According to FIG. 3, the two torque motors 21, 41 each comprise an internal rotor 22, 42, which is designed as a cylindrical or polyhedral extension of relatively short length, which projects perpendicularly from a lower side of the respective turntable 12, 32 and projects into the upper region of the associated column 11, 31. Situated directly opposite the rotor 22, 42, and forming a narrow air gap, is an associated stator 23, 43. The stator 23, 43 is arranged in the region of the upper end of the respective column 11, 31 and is preferably arranged circumferentially in a circumferential aperture (not shown) in the upper region of the associated pillar 11, 31. A rotary bearing 24, 44 for the rotary mounting of the turntable 12, 32 on the associated column 11, 31 is seated at a relatively short distance above the respective stator 23, 43. The arrangement of the bearings 24, 44 is expediently chosen in such a way that, the one hand, the attachment to the column 11, 31 can be made as rigid as possible and, on the other hand, that a maximum bearing diameter D, as close as possible to the holding chucks 16, 36, can be achieved. The relatively large bearing diameter D and the resulting short distance from the holding chucks 16, 36 advantageously contribute to a higher machining accuracy.

Because the respective rotor 22, 42 is attached directly to the associated turntable 12, 32, the torque is transferred via only a few components with little moving mass and a maximum rigidity of the structure, which, according to the invention, allows very high clock rates.

In an insertion region of the parent machine 10, the glass tubes 60 are first of all inserted into the holding chucks 16 vertically from above and then clamped at a suitable vertical level by the holding chucks 16, with the result that the lower end of the respective glass tube 60 is arranged in a working plane 17 in which various machining stations B1 . . . B9 are arranged in a manner distributed along the path of motion of the first turntable 12 (to be more precise, only some of these machining stations are illustrated in FIG. 4), wherein the depicted number of machining stations B1 . . . B9 is merely illustrative and is not intended to restrict the invention. The actual machining and/or hot forming of a glass tube 60 takes place in the working plane 17, i.e. at the level of the working plane 17.

In the case of the production of glass vials but also of cartridges or syringe barrels, the glass tube sections 60 at the transfer position 15 (cf. FIG. 4) have already been formed to give ready to use medicament outlet openings with a narrowed neck portion and a widened shoulder portion. These glass tube sections 60 are then transferred at the transfer position 15 to the downstream base machine 30, in which further forming of the bases of the glass vials takes place at the further machining stations B10 . . . B15.

As can be seen from FIG. 3, the upper end of the column 31 associated with the second turntable 32 extends through an opening in the worktable 50 of the parent machine 10 on which the column 1 associated with the first turntable 12 is arranged in a fixed manner. Thus, the drive motor 41 is arranged coaxially with the associated column 31 and, when viewed in a side view of the associated column 11, is arranged in partial overlap with the adjacent column 31 of the parent machine 10. The glass tubes 60 or semifinished products 61 can thus be transferred without a significant vertical offset at the transfer position 15.

As can be seen from FIG. 3, the rotary bearings 24, 44 are arranged at a short or negligible distance A, A' from the working plane 17, 38 between the glass tube 60 or semifinished product 61 after separation from the glass tube 60 and a machining tool 26 or are arranged in the parting plane 18 between the glass tube 60 and the semifinished product 61 separated therefrom, which, in conjunction with the relatively high rigidity of the structure, allows a high machining precision. The abovementioned distance A, A' is expediently of the order of an axial length of a glass container to be produced, preferably shorter than this axial length. The vertical distance between the respective rotary bearing 24, 44 and the associated working plane 17, 38 of the respective turntable 12, 32 can be at most 40 cm, more preferably at most 20 cm and even more preferably in a range between 3 cm and 15 cm, for example. The short distance A, A' prevents additional positioning errors due to angular misalignments between the glass tube 60 and the tool 26 or between the glass tube 60 and the semifinished product 61.

Figure 1:
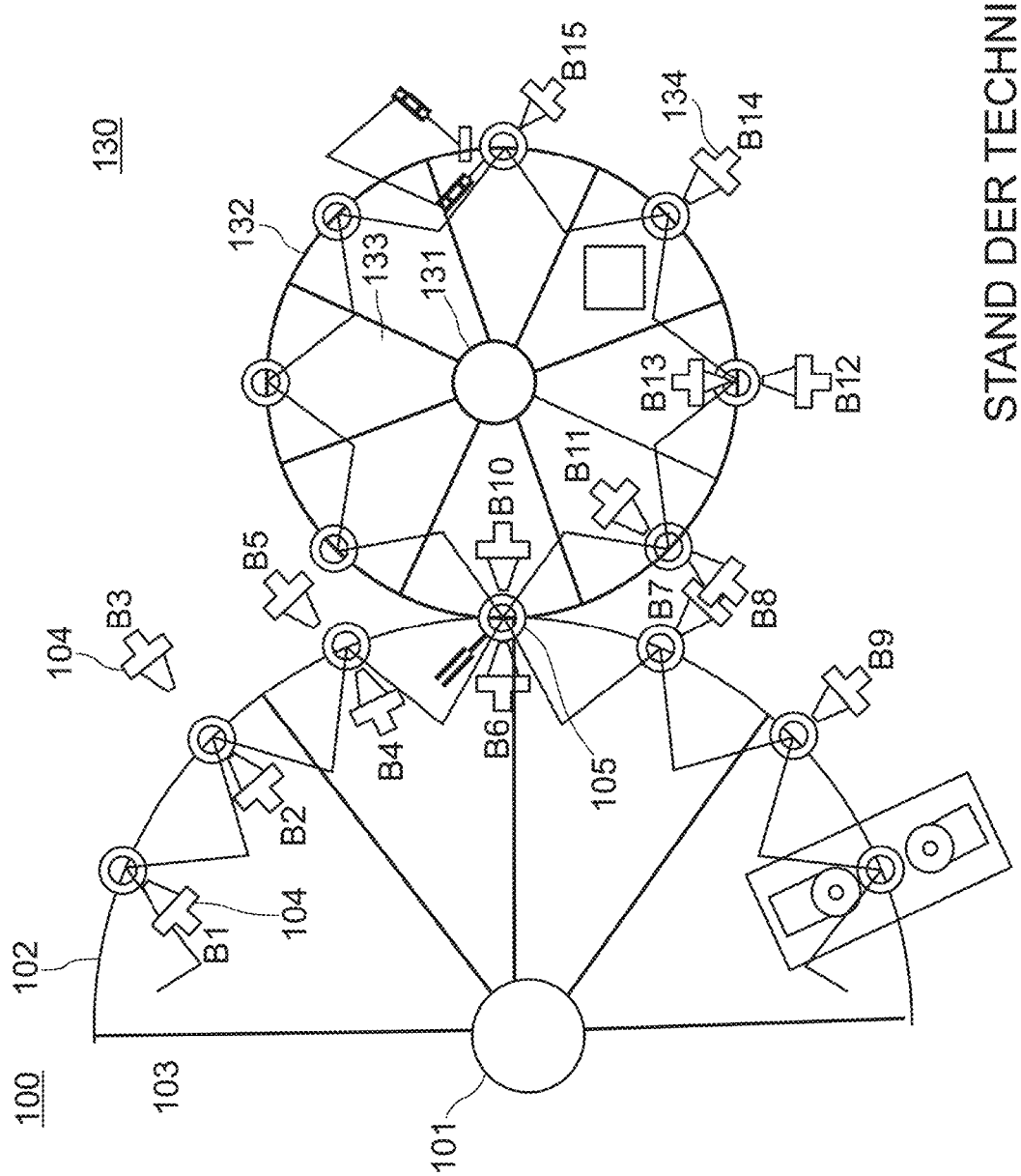
FIG. 1 shows parts of a hot forming device according to the prior art in a schematic plan view.

As can be seen from a comparison of FIGS. 1 and 4, it is in principle possible according to the invention for the columns 11, 31 to be formed with a relatively large diameter, contributing to even higher rigidity of the structure. There is a free choice of the diameter W of the bearings 24, 44, this being limited only by the diameter D of the respective column 11, 31 and the pitch circle of the holding chucks 16, 36 on the respective turntable 12, 32. The bearing diameter W chosen is expediently as large as possible and thus associated with as small as possible a distance from the holding chucks 16, 36 of the glass tubes 60 or semifinished products 61. According to the invention, a large bearing diameter reduces the specific loading on the bearing 24, 44 and thus the tendency for backlash to increase, allowing high accuracy over a very long operating time.

As shown in FIG. 3, a sensor 28 for determining a rotational position of the first turntable 12 is arranged on the lower side of the first turntable 12. A corresponding sensor (not shown) can also be arranged on the lower side of the second turntable 32 for the purpose of determining a rotational position of the second turntable 32. In this way, the angular motion of the respective turntable 12, 32 can be measured with a high resolution in the region of the respective rotary bearing 24, 44. According to FIG. 7, the sensor 28 is connected to a control circuit 29, which implements electronic control of the rotational position and/or pivoting motion of the respective turntable 12, 32. The control circuit 29 is assigned a lookup table 29', in which setpoints are stored. The electronic control system compares the signal of the sensor 28 to a predetermined position setpoint, for example. If there is a difference, the motor 21 is turned in the direction which ensures a shorter path of motion to the setpoint. This has the effect that the difference is reduced. The procedure is repeated until the current value is within the tolerance limits of the setpoint, either incrementally or by means of approximation. Moreover, this principle can also be used to control the torque and speed. It is thereby possible to achieve uniform movement profiles under fluctuating loads, for example. Thus, the accuracy of the positioning of the workpieces 60, 61 can be further increased. This control principle also allows better positioning accuracy, reduced expenditure of energy and an optimized power characteristic of the drive motors.

Figure 2:
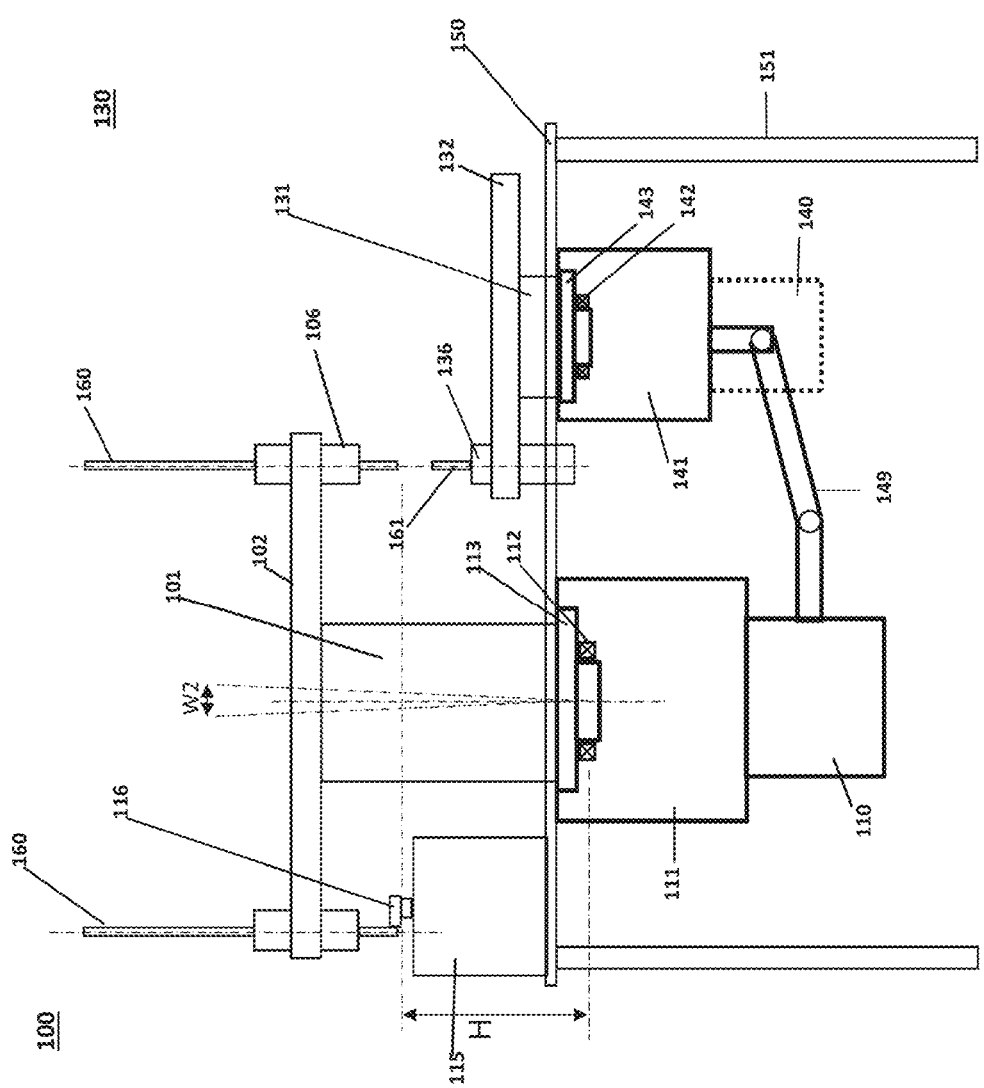
FIG. 2 shows the hot forming device according to FIG. 1 in a schematic sectioned side view.

Whereas conventional drive systems, in particular drive systems with indexing mechanisms, as described above with reference to FIGS. 1 and 2, have a fixed ratio (Z/S=const), built into the transmission, of the necessary time for pivoting (Z) to the standstill time (S) of the respective turntable for machining or forming the workpieces, it is in principle also possible, according to the invention, for this ratio to be set in a variable manner, in particular by means of the abovementioned control circuit 29 (FIG. 7). This is explained in greater detail by way of example below with reference to FIGS. 5 and 6, which, in a comparative view, show an adjustment curve 70 of a hot forming device according to the present invention and an adjustment curve 71 of a hot forming device according to the prior art.

From FIG. 5, it can be seen that, by virtue of the smaller masses to be moved, the time x for pivoting a turntable according to the invention can be shorter than the time Z for pivoting a turntable according to the prior art. Thus, according to the invention, it is precisely at very high clock rates that the standstill time S can be longer than the time Z for pivoting.

The abovementioned ratio is generally expressed in angular degrees for this type of hot forming device. A conventional value according to the prior art is 90°-100° for the pivoting (Z) and thus 360°-100°=260° for the standstill (S) between two pivoting movements. A corresponding angular illustration is shown in FIG. 6 for an adjustment curve of a hot forming device according to the present invention and for an adjustment curve of a hot forming device according to the prior art. It is clearly apparent that the time difference ΔK rises to an ever greater extent with an increasing number of pivoting movements.

According to the prior art, it is generally impossible to use the mechanically possible clock rates because the standstill time (machining time on the glass) becomes too short at high clock rates, and thus a process-engineering limit comes into effect. In contrast, the described drive concept according to the present invention showed very harmonious movements, which it was furthermore possible to optimize by means of control algorithms, on a prototype up to high clock rates that could not be achieved with conventional hot forming devices. It was also possible to choose the reduced pivoting time X of the drive concept according to the invention in a variable way (X/S=var), and it was possible to operate in a constant manner over the entire frequency range, with little tendency for vibration in the mechanical structure.

With the above drive system, in contrast to the prior art, the frequency of pivoting from one position to the next is not limited by a large mass to be rotated (transmission, support or column and turntable) and the resulting mechanical loading of the transmission (acceleration and braking for positioning). Transmissions which entail backlash between the component parts (e.g. gearwheels or mechanical cams and rollers) are not necessary in the drive train according to the invention, and this leads to a longer service life of the rotary mounting by virtue of lower loading and also improves the angular positioning accuracy parallel to the worktable. Because the point of action of the tools on the glass tube or on the semifinished product is over a relatively large diameter (by virtue of a large number of chucks) but the selected diameter of the rotary bearings in the drive concept according to the invention can be relatively large, errors are not multiplied in contrast to the prior art, resulting in a higher quality of the end product.

The mounting of the direct drive motor can be integrated into a machine frame section, in particular into a support, as explained above, or into a column, of relatively large diameter or can be provided directly on the machine frame section or column, e.g. on a circumferential projection on the outside of a respective column. Because the bearing is attached above the worktable, the height difference between the mounting and the point of engagement of the tools used for hot forming/machining (working plane) or between the mounting and the height of the transfer point of the semifinished product from the parent machine to a downstream base machine is small or even negligible, resulting in a higher rigidity of the drive assembly and higher precision in the machining or hot forming.

LIST OF REFERENCE SIGNS

| | |
|---|---|
| 1 | hot forming device |
| 10 | parent machine/main ring |
| 11 | machine frame section |
| 12 | turntable |
| 14 | gas burner |
| 15 | transfer region |
| 16 | holding chuck |
| 17 | working plane (parent machine) |
| 18 | parting plane |
| 20 | axis of rotation of main ring |
| 21 | torque motor |
| 22 | rotor |
| 23 | stator |
| 24 | rotary bearing |
| 25 | holding and positioning block |
| 26 | tool |
| 28 | rotational position sensor |
| 29 | control circuit |
| 29' | lookup table |
| 30 | base machine |
| 31 | column or support |
| 32 | turntable |
| 34 | gas burner |
| 36 | holding chuck |
| 37 | working plane (base machine) |
| 40 | axis of rotation |
| 41 | torque motor |
| 42 | rotor |
| 43 | stator |
| 44 | rotary bearing |
| 50 | worktable |
| 50' | additional holding plate |
| 51 | frame |
| 60 | glass tube/workpiece |
| 61 | semifinished product/workpiece |
| 70 | adjustment curve |
| 71 | adjustment curve |
| 100 | parent machine |
| 101 | turret |
| 102 | turntable |
| 103 | connecting strut |
| 104 | gas burner |
| 105 | transfer region |
| 106 | holding chuck |
| 110 | drive motor |

-continued

LIST OF REFERENCE SIGNS

| | |
|---|---|
| 111 | transmission |
| 112 | bearing |
| 113 | output flange |
| 115 | holding and positioning block |
| 116 | tool |
| 130 | base machine |
| 131 | turret |
| 132 | turntable |
| 133 | connecting strut |
| 134 | gas burner |
| 136 | holding chuck |
| 140 | drive motor |
| 141 | transmission |
| 142 | bearing |
| 143 | output flange |
| 149 | motor coupling |
| 150 | worktable |
| 151 | frame |
| 160 | glass tube |
| 161 | semifinished product |
| A, A' | distance |
| B1 . . . BN | machining stations |
| D | bearing diameter |
| H | distance |
| S | standstill time of a turntable |
| W | effective diameter |
| W2 | angular backlash |
| X | time |
| Y | cycle time |
| Z | time |
| ΔK | time difference |

What is claimed is:

1. A hot forming device for producing glass containers from a glass tube, comprising:
   a turntable;
   a plurality of holding chucks arranged over a circumference of the turntable;
   a machine frame having an upper region,
   wherein the machine frame is a support column that rotatably supports the turntable to the upper region; and
   a direct drive motor directly connecting the turntable to the machine frame without interposition of a transmission in order to drive a rotary motion of the turntable with respect to the machine frame, the direct drive motor having a stator and a rotor, wherein the stator is arranged at an upper end of the support column and the rotor is arranged on the turntable.

2. The hot forming device of claim 1, wherein the direct drive motor comprises a number of pole pairs greater than 20.

3. The hot forming device of claim 1, wherein the rotor is a cylindrical or polyhedral extension that projects perpendicularly from a lower side of the turntable and projects into the upper region of the machine frame.

4. The hot forming device of claim 1, wherein the stator is arranged in a circumferential aperture or in a plurality of recesses in the upper region of the machine frame.

5. The hot forming device of claim 1, further comprising a rotary bearing in a circumferential aperture in the upper region of the machine frame, wherein the rotary bearing has a vertical distance to a working plane of the turntable that is at most 40 cm.

6. The hot forming device of claim 5, wherein the vertical distance is at most 20 cm.

7. The hot forming device of claim 5, wherein the vertical distance is in a range between 3 cm and 15 cm.

8. The hot forming device of claim 1, further comprising a sensor positioned and configured to detect a rotational position of the turntable.

9. The hot forming device of claim 8, wherein the sensor is arranged in a region of a rotary bearing.

10. The hot forming device of claim 8, further comprising a control circuit in communication with the sensor, the control circuit being configured to process the rotational position of the turntable detected by the sensor and control a movement of the direct drive motor to correspond to a setpoint.

11. The hot forming device of claim 10, wherein the setpoint is an adjustable setpoint.

12. The hot forming device of claim 10, wherein the setpoint is stored in a lookup table connected to the control circuit.

13. The hot forming device of claim 10, wherein the control circuit is configured to rotate the turntable so that a ratio of a time (Z) for pivoting the turntable to a new working position to a standstill time (S), during which the turntable remains at the new working position, is adjustable.

14. The hot forming device of claim 1, wherein the direct drive motor is configured to rotate the turntable with a stepwise rotary movement at a constant clock rate.

15. The hot forming device of claim 1, wherein the support column has a circular cross section that extends perpendicular to the turntable.

16. The hot forming device of claim 1, further comprising a second turntable driven by a second direct drive motor, wherein the direct drive motor and second direct drive motor are configured and controlled to rotate the turntable and the second turntable with stepwise rotary movements at a constant clock rate, wherein the turntable and second turntable have paths of motion that intersect at a point at which a transfer of a workpiece from a holding chuck of the turntable to a holding chuck of the second turntable takes place.

17. The hot forming device of claim 16, further comprising a processing device arranged at each of a plurality of discrete working positions along the paths of motion of the turntable and the second turntable.

18. The hot forming device of claim 17, wherein the processing device comprises machining tool and/or a gas burner.

19. The hot forming device of claim 16, wherein the direct drive motor and the second direct drive motor are arranged coaxially and at different vertical levels.

20. The hot forming device of claim 16, further comprising a worktable on which the machine frame is supported, wherein the upper region of the machine frame associated with the second turntable extends through an opening in the worktable.

* * * * *